(12) United States Patent
Ge

(10) Patent No.: US 7,719,691 B2
(45) Date of Patent: May 18, 2010

(54) WAVEFRONT MEASURING APPARATUS FOR OPTICAL PICKUP

(75) Inventor: Zongtao Ge, Saitama (JP)

(73) Assignee: Fujinon Corporation, Saitama (JP)

( * ) Notice: Subject to any disclaimer, the term of this patent is extended or adjusted under 35 U.S.C. 154(b) by 84 days.

(21) Appl. No.: 12/193,975

(22) Filed: Aug. 19, 2008

(65) Prior Publication Data
US 2009/0073459 A1 Mar. 19, 2009

(30) Foreign Application Priority Data
Sep. 14, 2007 (JP) ............... P2007-238864

(51) Int. Cl.
*G01B 9/02* (2006.01)
(52) U.S. Cl. .................... 356/489
(58) Field of Classification Search ........ 356/484, 356/485, 488, 489, 494, 499, 511, 512, 515
See application file for complete search history.

(56) References Cited

U.S. PATENT DOCUMENTS

| 4,340,304 | A | * | 7/1982 | Massie ............. 356/489 |
| 4,744,659 | A | | 5/1988 | Kitabayashi |
| 4,972,075 | A | * | 11/1990 | Hamada et al. ....... 250/201.5 |
| 5,062,094 | A | * | 10/1991 | Hamada et al. ....... 369/44.12 |
| 5,309,416 | A | * | 5/1994 | Iwanaga et al. ....... 369/13.03 |
| 5,828,453 | A | * | 10/1998 | Yamamoto et al. ...... 356/515 |
| 6,134,199 | A | * | 10/2000 | Ceshkovsky ......... 369/44.35 |
| 6,611,339 | B1 | * | 8/2003 | Yang et al. ......... 356/485 |
| 6,714,306 | B1 | * | 3/2004 | Chovan et al. ........ 356/484 |
| 6,747,925 | B2 | * | 6/2004 | Cheng ............. 369/44.35 |
| 7,016,272 | B2 | * | 3/2006 | Enokihara .......... 369/44.29 |
| 7,061,594 | B2 | * | 6/2006 | Worthington et al. ..... 356/72 |
| 7,333,213 | B2 | * | 2/2008 | Kempe .............. 356/489 |
| 2004/0136008 | A1 | * | 7/2004 | Iwanami et al. ....... 356/498 |
| 2005/0007603 | A1 | | 1/2005 | Arieli et al. |
| 2005/0270543 | A1 | | 12/2005 | Ge et al. |

FOREIGN PATENT DOCUMENTS

| JP | 58-60590 A | 4/1983 |
| JP | 2000-97612 A | 4/2000 |
| JP | 2005-345441 A | 12/2005 |
| JP | 2006-329720 A | 12/2006 |
| JP | 2006-343121 A | 12/2006 |

\* cited by examiner

*Primary Examiner*—Gregory J Toatley, Jr.
*Assistant Examiner*—Scott M Richey
(74) *Attorney, Agent, or Firm*—Birch, Stewart, Kolasch & Birch, LLP

(57) ABSTRACT

A wavefront measuring apparatus for optical pickup includes: a beam splitting section; a wavefront shaping section; a beam combining section that generate interference light; an interference fringe image-acquiring section that acquires an interference fringe image including wavefront information of the light beam; and an analyzing section that analyzes a wavefront of the light beam on the basis of the interference fringe image. The analyzing section includes: an image processing section that performs a filtering process on the interference fringe image to eliminate a frequency component corresponding to the sub beam, so as to acquire the filtering-processed interference fringe image, and a wavefront analyzing section that analyzes a wavefront of the main beam on the basis of the filtering-processed interference fringe image.

3 Claims, 5 Drawing Sheets

WAVEFRONT MEASURING APPARATUS FOR OPTICAL PICKUP

This application is based on and claims priority under 35 U.S.C §119 from Japanese Patent Application No. 2007-238864, filed on Sep. 14, 2007, the entire disclosure of which is herein incorporated by reference.

BACKGROUND OF THE INVENTION

1. Field of the Invention

The present invention relates to a wavefront measuring apparatus for measuring a wavefront of a light beam by means of optical interferometry, particularly, to a wavefront measuring apparatus for optical pickup appropriate to measure a wavefront of a light beam mixed with a sub beam for a tracking adjustment, which is output from the optical pickup apparatus.

2. Description of Related Art

As wavefront measuring apparatuses that measure a light beam by means of optical interferometry, optical system arrangement based on Mach-Zehnder interferometer has been generally used. However, recently, wavefront measuring apparatuses using optical system arrangement based on Fizeau interferometer or optical system arrangement based on Michelson interferometer have been put to practical use (see JP-A-2005-345441 and JP-A-2006-343121).

Fizeau type and Michelson type wavefront measuring apparatus is characterized in that a reflection-type wavefront shaping unit is used as means for making a reference beam from a light beam to be measured. The reflection-type wavefront shaping unit has an optical element (hereinafter, it is referred to as a "reflecting/diffracting section" or "reflecting and diffracting section") that shapes a wavefront of the light beam to be measured, by reflecting a part of a beam for reference beam generation, which is split from the light beam, in a direction opposite to an incident direction. In such a reflecting/diffracting section which is also called a reflection type pinhole, it has been known to form a micro reflection area on a glass substrate, to form a micro reflection area on a front end of a needle-shaped member (see JP-A-2000-097612), to dispose a reflective surface just close to the rear side of a normal pinhole (see JP-A-58-60590), or the like.

The wavefront measuring apparatuses as described above are used for measuring a wavefront of a light beam output from an optical pickup apparatus for reading out signals of an optical disk such as CD or DVD. In the optical pickup apparatus, three beam method of: splitting a light beam emitted from a light source into a main beam for reading data pit column and two sub beams for a tracking adjustment; and outputting the beams is generally used.

Since the light beam output from the optical pickup apparatus has the main beam and the sub beam mixed with each other, in a case where an interference fringe image thereof is taken by inputting the light beam into the wavefront measuring apparatus, an undesirable interference fringe component caused by the sub beam is superposed on the taken interference fringe image. Hence, even when the interference fringe image is analyzed, it is difficult to obtain favorable result of wavefront measurement for the main beam.

Accordingly, it can be also considered that the sub beam is blocked by using a pinhole plate and only the main beam is selectively input to the wavefront measuring apparatus. However, it is difficult to precisely dispose the pinhole plate on a position where the sub beam can be blocked and only the main beam can pass, and it takes much time. In particular, in a case of an optical pickup apparatus configured to be able to output a light beam having a plurality of mutually different wavelengths corresponding to standards of optical disks, it is necessary to change a diameter of the pinhole in accordance with a wavelength of the light beam to be measured. Thus, a lot of time is needed for the measurement.

SUMMARY OF THE INVENTION

An object of an illustrative, non-limiting example of the invention is to provide a wavefront measuring apparatus for optical pickup capable of easily and precisely measuring a wavefront of a main beam output from an optical pickup apparatus in a state where the sub beam for a tracking adjustment is mixed therewith.

According to an aspect of the invention, there is provided a wavefront measuring apparatus for optical pickup, which includes: a beam splitting section that splits a light beam output from an optical pickup apparatus into a first beam for inspection and a second beam for reference beam generation; a wavefront shaping section that shapes a wavefront of the second beam to convert the second beam into a reference beam; a beam combining section that combine the first beam and the reference beam to generate interference light; an interference fringe image-acquiring section that acquires an interference fringe image including wavefront information of the light beam on the basis of the interference light; and an analyzing section that analyzes a wavefront of the light beam on the basis of the interference fringe image.

The light beam includes a main beam and a sub beam for a tracking adjustment, and the analyzing section includes: an image processing section that performs a filtering process on the interference fringe image to eliminate a frequency component corresponding to the sub beam, so as to acquire the filtering-processed interference fringe image, and a wavefront analyzing section that analyzes a wavefront of the main beam on the basis of the filtering-processed interference fringe image.

According to the aspect, the image processing section may be adapted to acquire the filtering-processed interference fringe image by: performing Fourier transform on the interference fringe image to acquire amplitude spectrum; eliminating the frequency component corresponding to the sub beam from the amplitude spectrum; and performing inverse Fourier transform on the amplitude spectrum after the eliminating of the frequency component.

In addition, the wavefront shaping section may a reflective wavefront shaping unit including: a convergent lens that converges the second beam; and a micro reflecting and diffracting section disposed on a convergent point of the convergent lens, and the reflective wavefront shaping unit shapes a wavefront of the second beam to convert the second beam into a reference beam and emits the reference beam toward the beam splitting section.

In the "micro reflecting and diffracting section", size thereof can be determined by diffraction limit of a convergent beam that is condensed (convergent) on the reflecting and diffracting section (it may be constituted so as to be smaller than the diffraction limit), and the section has a function of reflecting at least a part of the convergent beam as a spherical wave of which a wavefront is shaped. As for such a reflecting and diffracting section, it is possible to employ various configurations. However, exemplary examples of the reflecting and diffracting section include forming a micro reflection area on a substrate, forming a micro reflection area on a front end of a needle-shaped member, disposing a reflective surface just close to the rear side of a pinhole, or the like.

BRIEF DESCRIPTION OF THE DRAWINGS

The features of the invention will appear more fully upon consideration of the exemplary example of the invention, which are schematically set forth in the drawings, in which.

DETAILED DESCRIPTION OF THE EXEMPLARY EMBODIMENTS

According to an exemplary embodiment of the wavefront measuring apparatus for optical pickup of the aspect of the invention, the following advantages can be obtained by the configurations mentioned above.

Specifically, instead of optically eliminating the sub beam included in the light beam output from the optical pickup apparatus by using a pinhole plate and the like, the interference fringe image is taken by inputting the light beam in a state where the sub beam is mixed, and then the frequency component corresponding to the sub beam is eliminated from the interference fringe image by the filtering process performed on the interference fringe image. Therefore, it is possible to easily obtain an interference fringe image on which an undesirable interference fringe component caused by the sub beam is not superposed.

In addition, wavefront analysis is performed on the basis of the interference fringe image, on which undesirable interference fringe component caused by the sub beam is not superposed, processed by the filtering process. Thus, it is possible to obtain favorable result of wavefront measurement for the main beam.

Further, the main beam and the sub beam have originally the same wavelength in the optical pickup apparatus, but since the sub beam is emitted to be inclined at an angle with respect to the main beam, a wavefront of the sub beam interferes with a wavefront of the reference beam in the inclined state. Hence, in the taken interference fringe image, it is observed that the part thereof corresponding to the sub beam has a frequency. An exemplary embodiment of the invention is based on the observation mentioned above.

Figure 1:
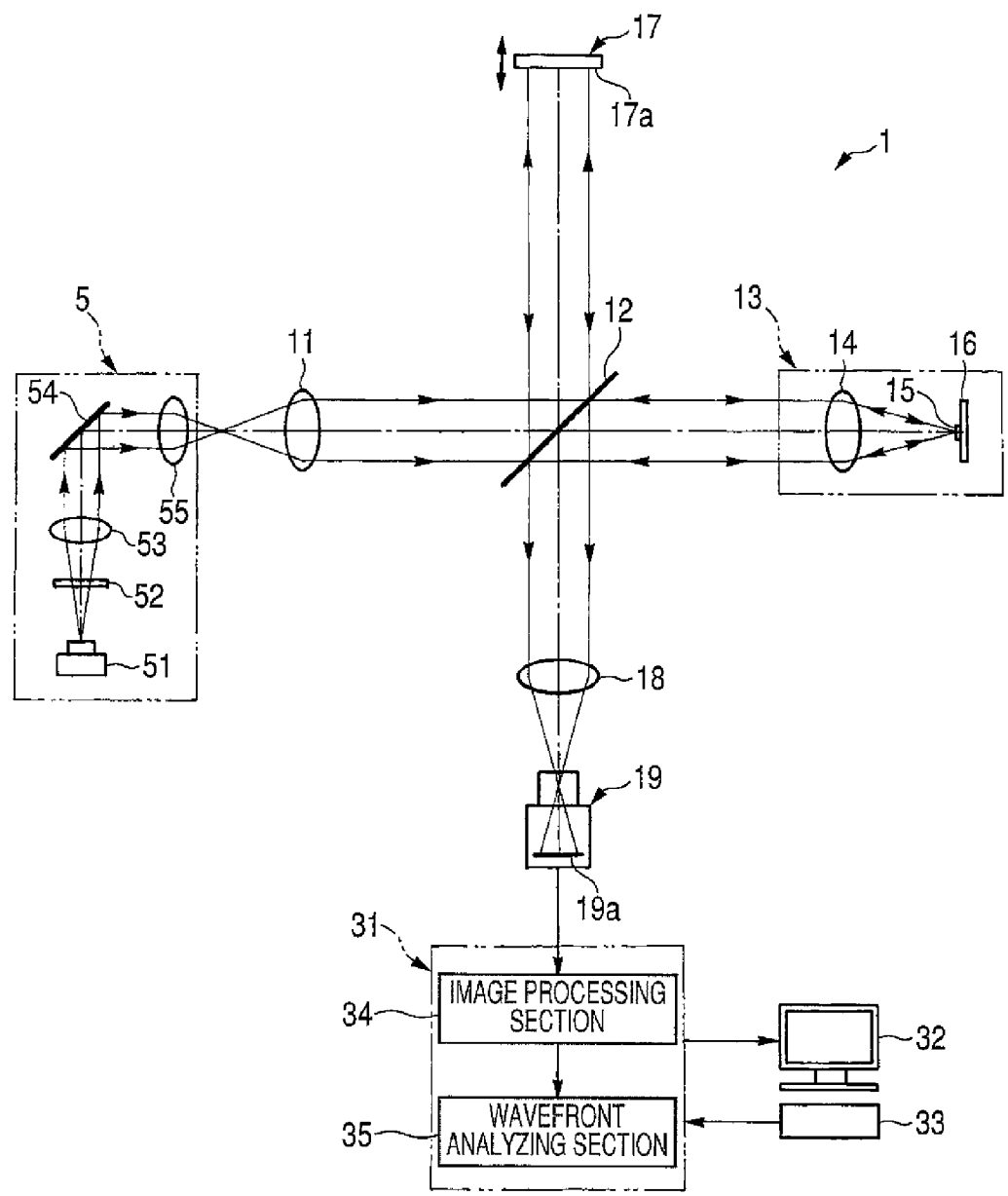
FIG. 1 is a schematic configuration diagram showing a wavefront measuring apparatus for optical pickup according to an exemplary embodiment of the invention.

Hereinafter, a wavefront measuring apparatus for optical pickup according to an exemplary embodiment of the invention will be described in detail with reference to the drawings. FIG. 1 is a schematic configuration diagram showing the wavefront measuring apparatus for optical pickup according to an exemplary embodiment of the invention.

A wavefront measuring apparatus for optical pickup 1 shown in FIG. 1 is to measure a wavefront of a light beam output from an optical pickup apparatus 5. First, the optical pickup apparatus 5 will be described.

The optical pickup apparatus 5 shown in FIG. 1 has: a light source 51 such as a semiconductor laser for outputting a light beam; a diffraction grating 52 that splits the light beam output from the light source 51 into a main beam for reading out data pit column and two sub beams for a tracking adjustment; a collimator lens 53 that collimates the light beams transmitted through the diffraction grating 52; a reflection mirror 54 that reflects the light beams collimated by the collimator lens 53 toward the right side in the drawing; and a condensing lens 55 that condenses the light beam reflected from the reflection mirror 54. The optical pickup apparatus is configured to emit the light beam to be measured toward the right side in the drawing.

Next, the wavefront measuring apparatus for optical pickup 1 will be described. The wavefront measuring apparatus for optical pickup 1 shown in FIG. 1 employs arrangement of a Michelson type optical system. The wavefront measuring apparatus for optical pickup has: a collimator lens 11 that guides the light beam exiting from the optical pickup apparatus 5 into the optical system; a beam splitting section 12 that splits the guided light beam output from an optical pickup apparatus into a beam for inspection and a beam for reference beam generation; a wavefront shaping section 13 that converts the beam for reference beam generation into a reference beam by shaping a wavefront thereof; a beam combining section 12 that acquires interference light by combining the beam for inspection and the reference beam with each other; an interference fringe image acquiring sections 18 and 19 that acquire an interference fringe image including wavefront information of the light beam on the basis of the interference light acquired by the beam combining section; and an analyzing section 31 that analyzes a wavefront of the light beam on the basis of the interference fringe image acquired by the interference fringe image acquiring section.

Specifically, the wavefront shaping section is formed as a reflection-type wavefront shaping unit 13. The reflection-type wavefront shaping unit 13 has: a convergent lens 14 that converges the beam for reference beam generation incident from the left side in the drawing; and a micro reflecting/diffracting section 15 disposed on a convergent point of the convergent lens 14. The reflection-type wavefront shaping unit converts an incident part of the beam for reference beam generation into the reference beam by shaping a wavefront thereof, and emitting the reference beam toward the beam splitting section.

In addition, the reflecting/diffracting section 15 is made of a metallic film such as gold, aluminum, or chromium formed on a substrate 16 by deposition or the like. A size thereof is smaller than a diffraction limit of the light beam incident as a convergent beam. In addition, the reflecting/diffracting section is configured to reflect a convergently incident part of the beam for reference beam generation as a wavefront-shaped ideal spherical wave. Moreover, on a surface of the substrate 16 opposed to the convergent lens 14, an antireflective coating process corresponding to a wavelength of the light beam is performed. Thus, the beam for reference beam generation before shaping the wavefront thereof does not return to the convergent lens 14.

The beam splitting section and the beam combining section is formed as a beam splitting/combining surface 12. The beam splitting/combining surface 12 if formed by a beam splitter such as a prism having a cube shape, a half mirror having a plate shape, or the like. With such a configuration, the beam for inspection split from the beam for reference beam generation is made to be incident on a reflective surface 17a (which is planarized with high accuracy so as to keep a wavefront of the incident beam) of a reflecting plate 17 disposed on the upper part of the drawing. In addition, the beam for inspection returning from the reflective surface 17a is made to combine with the reference beam exiting from the reflection-type wavefront shaping unit 13.

Moreover, on the reflecting plate 17, there is provided a fringe scan adapter having an one-axis stage that holds the reflecting plate 17 to be movable in an optical axis direction (an up and down direction in the drawing), a piezoelectric device, and the like (not shown in the drawing). When the light beam to be measured is low-coherent light, the one-axis stage is formed to make a length of a first optical path, which returns from the beam splitting/combining surface 12 through the reflective surface 17a to the beam splitting/combining surface 12, substantially equal to a length of a second optical path, which returns from the beam splitting/combining surface 12 through the reflection-type wavefront shaping unit 13 to the beam splitting/combining surface 12. In addition, the fringe scan adapter constitutes a phase shift mechanism. For example, when a sub fringe measurement and the like using a phase shift method is performed, the piezoelectric device drives the reflecting plate 17 to minutely move in the optical axis direction.

The interference fringe image acquiring section has an imaging lens 18 and an imaging camera 19. The imaging lens 18 is configured to form interference fringe image acquired from the interference light generated from the beam splitting/combining surface 12 on an image pickup surface 19a (an image pickup surface of CCD, CMOS, or the like) of the imaging camera 19. The imaging camera 19 is configured to take an interference fringe image formed on the image pickup surface 19a and output a signal of the image.

The analyzing section has an analyzing device 31 that performs various image processings and image analysis on the basis of the image signal acquired from the imaging camera 19, a display device 32 that displays an image or analysis result acquired from the analyzing device 31, and an input device 33 such as a key board or a mouse.

The analyzing device 31 is formed as a computer and the like. In the analyzing device, there is provided an image processing section 34 that performs a filtering process on the taken interference fringe image on the basis of the image signal taken from the imaging camera 19 and acquires the filtering-processed interference fringe image excluding a frequency component corresponding to a sub beam for a tracking adjustment included in the light beam. Also provided is a wavefront analyzing section 35 that analyzes a wavefront of the main beam included in the light beam on the basis of the filtering-processed interference fringe image. In addition, specifically, each of the image processing section 34 and the wavefront analyzing section 35 may be constituted of a processing program stored in a memory or the like, a calculation circuit that performs the processing program, and the like.

Next, the operation at the time of measurement performed by the wavefront measuring apparatus for optical pickup 1 mentioned above will be described.

As shown in FIG. 1, the light beam that is emitted from the optical pickup apparatus 5 to the right side in the drawing and includes the main beam and the sub beam mixed with each other is collimated by the collimator lens 11, and is incident on the beam splitting/combining surface 12. Then, in the beam splitting/combining surface 12, the light beam is split into a beam for inspection reflected toward the upper side in the drawing and a beam for reference beam generation transmitted through the beam splitting/combining surface 12 toward the reflection-type wavefront shaping unit 13.

The beam for reference beam generation transmitted to the reflection-type wavefront shaping unit 13 is converged by the convergent lens 14, is incident on the reflecting/diffracting section 15. Then, in the reflecting/diffracting section 15, a part thereof is converted into a wavefront-shaped spherical wave, and is reflected toward the convergent lens 14. In the convergent lens 14, this spherical wave is converted into a plane wave, and is transmitted as a reference beam toward the beam splitting/combining surface 12. In the beam splitting/combining surface 12, a part of the reference beam is reflected toward the lower side in the drawing.

On the other hand, the beam for inspection reflected from the beam splitting/combining surface 12 toward the upper side in the drawing is reflected in a reverse direction by the reflective surface 17a of the reflecting plate 17, and returns to the beam splitting/combining surface 12. Then, a part thereof is transmitted through the beam splitting/combining surface 12 toward the lower side in the drawing.

The beam for inspection is combined with the reference beam reflected from the beam splitting/combining surface 12, whereby the interference light is acquired. The interference light is incident on the image pickup surface 19a in the imaging camera 19 through the imaging lens 18, and forms an interference fringe image including wavefront information of the light beam on the image pickup surface 19a. The formed interference fringe image is taken by the imaging camera 19, and the image signal thereof is output to the analyzing device 31. Then, in the image processing section 34 of the analyzing device 31, the image signal is processed by the filtering process, and in the wavefront analyzing section 35, the filtering-processed interference fringe image is analyzed. As a result, wavefront measurement result of the main beam is acquired.

Figure 2:
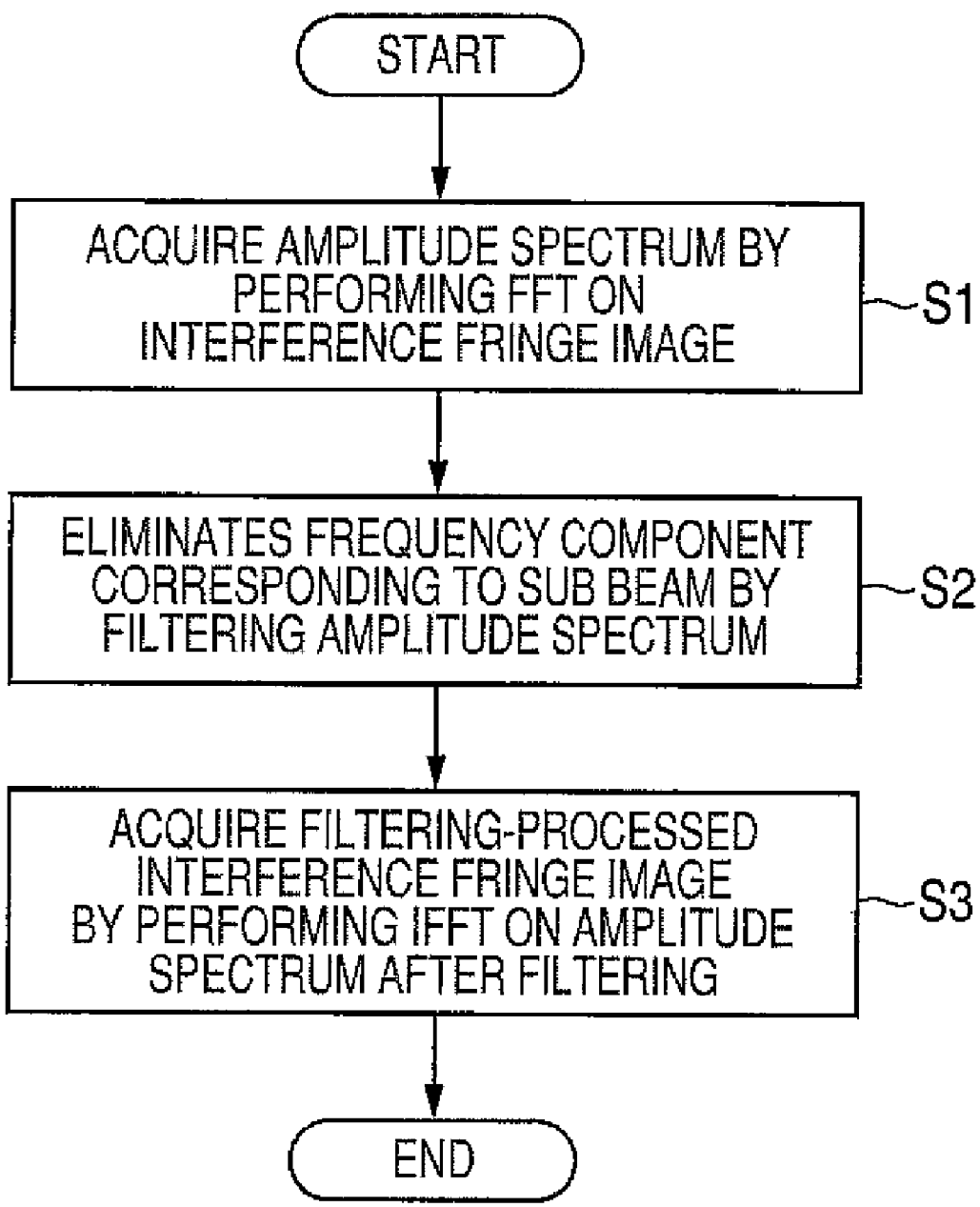
FIG. 2 is a flow chart showing a procedure of a filtering process.

Hereinafter, the filtering process in the image processing section 34 will be described in further detail. FIG. 2 is a flow chart showing a procedure of the filtering process.

(1) First, an amplitude spectrum in frequency region is acquired by performing a fast Fourier transformed (FFT) on the interference fringe image taken by the imaging camera 19 (step S1 in FIG. 2).

Figure 3:
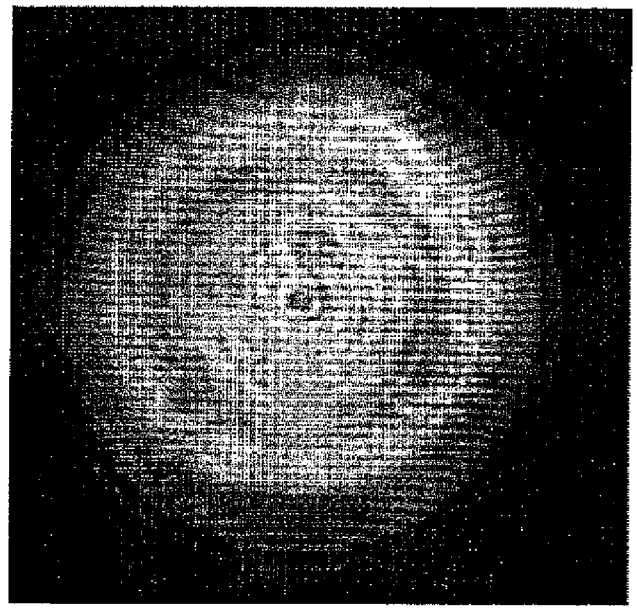
FIG. 3 is a view showing an example of an interference fringe image before the filtering process.

FIG. 3 is a view showing an example of the interference fringe image. In the interference fringe image shown in FIG. 3, it is possible to know that high-frequency interference fringes (the interference fringes formed in a micro check shape having a substantially constant fringe spacing) formed by the interference light between the reference beam and the sub beam of the beam for inspection are superposed.

Figure 4:
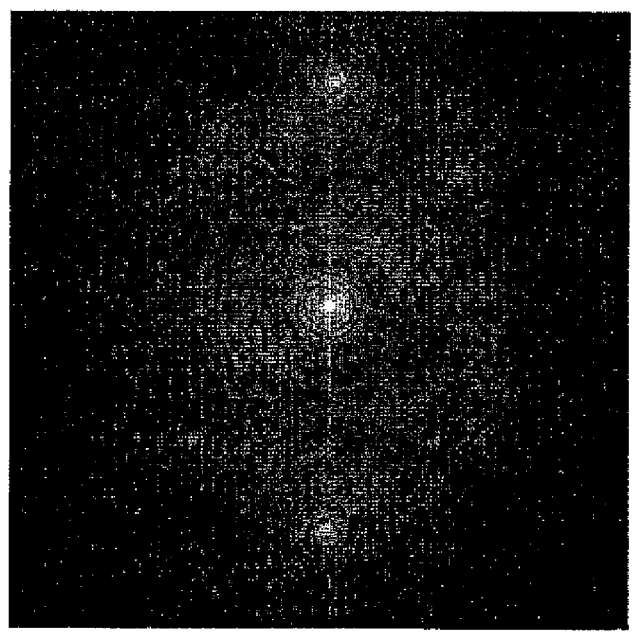
FIG. 4 is a view showing an example of an amplitude spectrum before the filtering process.

In addition, FIG. 4 is a view showing an example of the amplitude spectrum. In FIG. 4, a size of the amplitude spectrum is represented by an image density value of a two-dimensional image, and the parts having high density values at two positions, which are symmetrically located about an image center position in a up and down direction, are observed. The observation shows a frequency component corresponding to the sub beam.

(2) Next, the acquired amplitude spectrum is processed by the filtering (for example, the amplitude spectrum is multiplied by a predetermined filter function), and the frequency component corresponding to the sub beam is eliminated (step S2 in FIG. 2).

Figure 5:
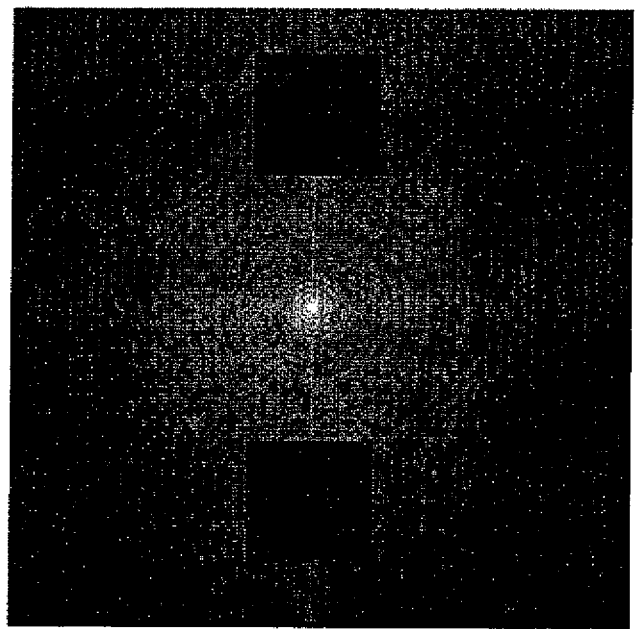
FIG. 5 is a view showing an example of an amplitude spectrum after the filtering process.

FIG. 5 is a view showing an example of the amplitude spectrum after the filtering process. In FIG. 5, a size of the amplitude spectrum after the filtering is represented by an image density value of a two-dimensional image, and the frequency component corresponding to the sub beam is eliminated by the filtering.

In addition, as a filter function used in the filtering, it is possible to use a function having an optional shape capable of satisfactorily eliminating the frequency component corresponding to the sub beam. In the example shown in FIG. 5, a filter function having a prism shape in which a transition band is rapidly inclined was used, but a filter function having a shape in which a transition band is slightly changed like Gauss distribution may be used. In addition, a filter function setting for the amplitude spectrum can be performed by an operator in accordance with a state of the amplitude spectrum, but it is also possible to set an appropriate filter function by automatically analyzing the state of the amplitude spectrum in the image processing section 34.

(3) Next, the interference fringe image after the filtering process is acquired by performing inverse fast Fourier transform (IFFT) on the amplitude spectrum after the filtering.

Figure 6:
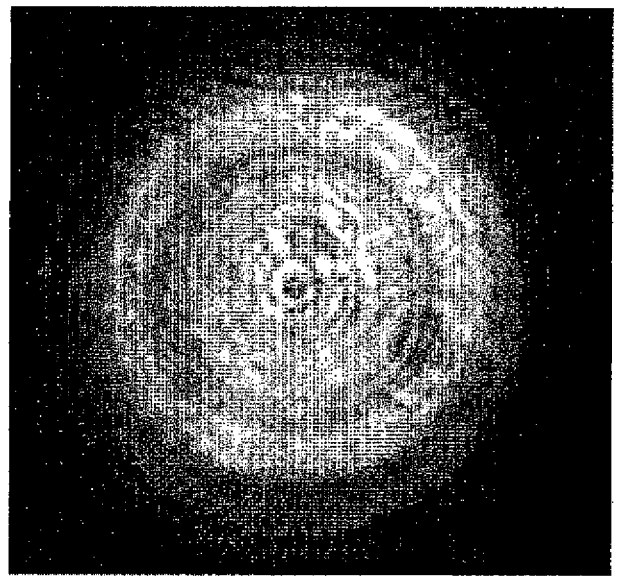
FIG. 6 is a view showing an example of an interference fringe image after the filtering process.

FIG. 6 is a view showing an example of the interference fringe image after the filtering process. In the interference fringe image after the filtering process shown in FIG. 6, it is possible to know that high-frequency interference fringe formed by the interference light between the sub beam and the reference beam is eliminated.

Subsequently, the wavefront form of the main beam is acquired by performing processes such as a fringe analysis and an unwrapping in the wavefront analyzing section 35 (see FIG. 1) on the basis of the acquired interference fringe image after the filtering process.

In addition, in the embodiment, a phase shift method is used in order to acquire and analyze the interference fringe image. By using the fringe scan adapter, which is not shown in the drawing, for minutely moving the reflecting plate 17 (see FIG. 1), a phase of the beam for inspection with respect to the reference beam is changed by a predetermined step, and the interference fringe image is taken for every step.

The filtering processes in (1) to (3) are performed on each interference fringe image for each step. In addition, the wavefront form of the main beam is acquired by performing processes such as a fringe analysis and an unwrapping in a phase shift method in the wavefront analyzing section 35 on the basis of the acquired interference fringe image after the filtering process.

Figure 7:
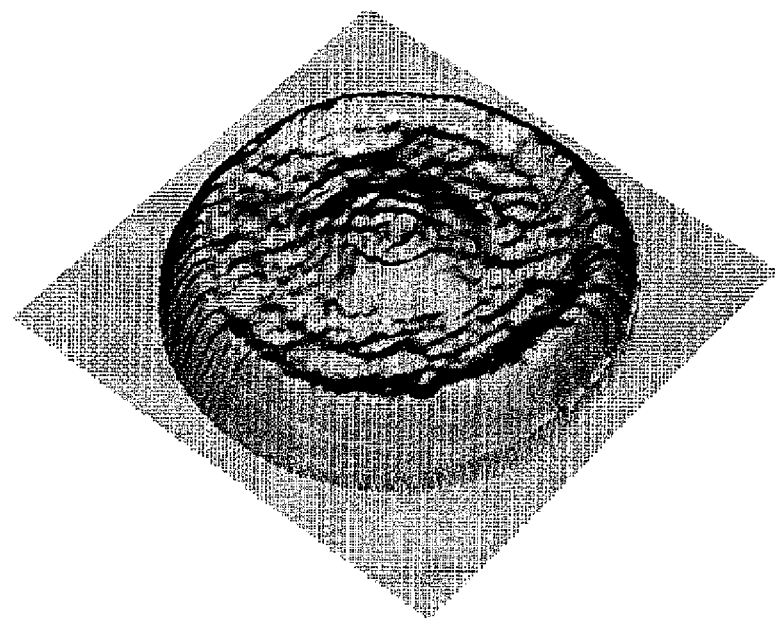
FIG. 7 is a view showing an example of a wavefront analysis result based on the interference fringe image after the filtering process.
Figure 8:
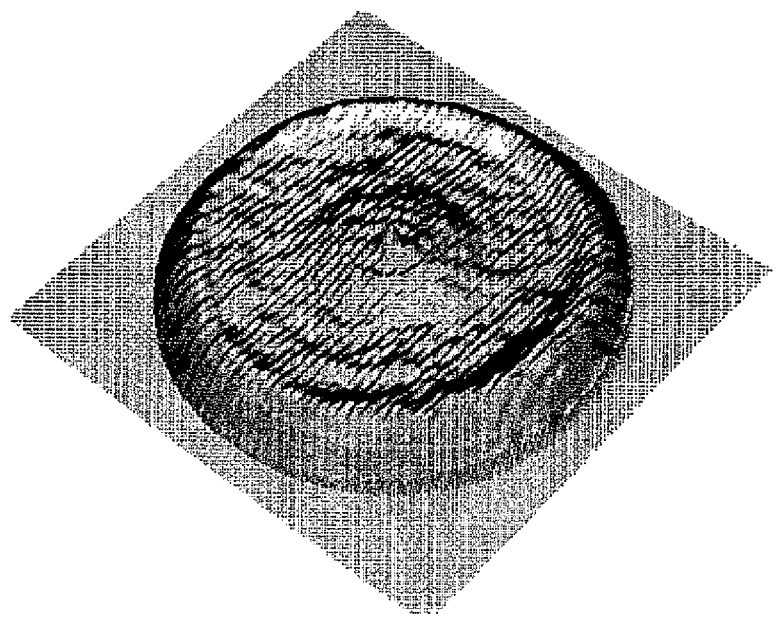
FIG. 8 is a view showing an example of a wavefront analysis result based on the interference fringe image before the filtering process.

FIG. 7 is a view showing an example (three-dimensional image) of a wavefront analysis result based on the interference fringe image after the filtering process. In addition, as a comparative example FIG. 8 is a view showing an example (three-dimensional image) of a wavefront analysis result based on the interference fringe image on which the filtering process is not performed. In the wavefront analysis result shown in FIG. 8, because of an effect of interference light superposition between the sub beam and the reference beam, unevenness having a micro check shape is shown in the wavefront. Conversely, in the wavefront analysis result shown in FIG. 7, such unevenness having a micro check shape is not shown, and the wavefront form of the main beam is satisfactorily reproduced.

Although the embodiment of the invention has been described in detail, the invention is not limited to the embodiment mentioned above, and may be modified to various forms of the embodiment.

For example, in the embodiment mentioned above, it is premised that the wavelength of the light beam to be measured does not changes, and thus the reflection-type wavefront shaping unit 13 is only one kind. However, to correspond to a case where there is a plurality of the light beams having mutually different wavelengths respectively, plural kinds of the reflection-type wavefront shaping units corresponding to the wavelengths respectively may be provided. In this case, when a wavelength of a light beam to be measured is changed, appropriate one of them can be used by being switched among them. In addition, the aspect mentioned above is disclosed in JP-A-2006-329720.

In addition, in the embodiment, the taken interference fringe image is Fourier transformed, is processed by the filtering in a frequency region, and then is made to return to a spatial region. However, the filtering process may be directly performed in the spatial region.

In addition, in the aspect shown in FIG. 1, arrangement of Michelson type optical system was employed, but arrangement of Fizeau-type optical system disclosed in JP-A-2005-345441 mentioned above may be employed. In addition, the invention may be applied to the wavefront measuring apparatus employing arrangement of Mach-Zehnder type optical system that does not use the reflection-type wavefront shaping unit.

In addition, the aforementioned various aspects disclosed in JP-A-2000-097612 and 4 may be also applied the reflecting/diffracting section 15 used in the wavefront shaping unit 13.

What is claimed is:

1. A wavefront measuring apparatus for optical pickup comprising:
   a beam splitting section that splits a light beam output from an optical pickup apparatus into a first beam for inspection and a second beam for reference beam generation;
   a wavefront shaping section that shapes a wavefront of the second beam to convert the second beam into a reference beam;
   a beam combining section that combine the first beam and the reference beam to generate interference light;
   an interference fringe image-acquiring section that acquires an interference fringe image including wavefront information of the light beam on the basis of the interference light; and
   an analyzing section that analyzes a wavefront of the light beam on the basis of the interference fringe image,
   wherein
   the light beam includes a main beam and a sub beam for a tracking adjustment, and
   the analyzing section includes: an image processing section that performs a filtering process on the interference fringe image to eliminate a frequency component corresponding to the sub beam, so as to acquire the filtering-processed interference fringe image, and
   a wavefront analyzing section that analyzes a wavefront of the main beam on the basis of the filtering-processed interference fringe image.

2. The wavefront measuring apparatus for optical pickup according to claim 1, wherein the image processing section is adapted to acquire the filtering-processed interference fringe image by: performing Fourier transform on the interference fringe image to acquire amplitude spectrum; eliminating the frequency component corresponding to the sub beam from the amplitude spectrum; and performing inverse Fourier transform on the amplitude spectrum after the eliminating of the frequency component.

3. The wavefront measuring apparatus for optical pickup according to claim 1, wherein
   the wavefront shaping section is a reflective wavefront shaping unit including: a convergent lens that converges the second beam; and a micro reflecting and diffracting section disposed on a convergent point of the convergent lens, and
   the reflective wavefront shaping unit shapes a wavefront of the second beam to convert the second beam into a reference beam and emits the reference beam toward the beam splitting section.

* * * * *